(12) United States Patent
Smith et al.

(10) Patent No.: US 8,794,187 B2
(45) Date of Patent: Aug. 5, 2014

(54) TRAILER FOR TRANSPORTING LIVING FOWL

(75) Inventors: Rocky L. Smith, Fairview, NC (US); G. D. Smith, Fairview, NC (US)

(73) Assignee: Smithway, Inc., Fairview, NC (US)

( * ) Notice: Subject to any disclaimer, the term of this patent is extended or adjusted under 35 U.S.C. 154(b) by 20 days.

(21) Appl. No.: 13/245,115

(22) Filed: Sep. 26, 2011

(65) Prior Publication Data

US 2013/0074777 A1    Mar. 28, 2013

(51) Int. Cl.
 *B60P 3/04* (2006.01)
(52) U.S. Cl.
 USPC .............. 119/401; 454/83; 454/91; 454/92; 454/118; 62/407; 98/6
(58) Field of Classification Search
 USPC ......... 119/400, 401, 406, 412, 415, 441, 448, 119/487–489, 493, 496; 62/407, 237; 452/53
 See application file for complete search history.

(56) References Cited

U.S. PATENT DOCUMENTS

| 3,792,595 | A |   | 2/1974  | Willis |   |
|---|---|---|---|---|---|
| 4,454,837 | A |   | 6/1984  | Luebke |   |
| 4,481,870 | A |   | 11/1984 | Smith |   |
| 4,553,403 | A | * | 11/1985 | Taylor | 62/239 |
| 4,553,584 | A | * | 11/1985 | Bloomquist | 165/263 |
| 4,726,196 | A |   | 2/1988  | Zajic |   |
| 4,884,496 | A | * | 12/1989 | Donavich | 454/88 |
| 5,101,643 | A | * | 4/1992  | Hicke | 62/407 |
| 5,152,155 | A | * | 10/1992 | Shea et al. | 62/385 |
| 5,176,388 | A | * | 1/1993  | Horton | 296/155 |
| 5,830,057 | A |   | 11/1998 | Hunt, Jr. |   |
| 6,138,578 | A |   | 10/2000 | Cowan, Jr. et al. |   |
| 6,151,908 | A | * | 11/2000 | Graaff | 62/371 |
| 6,467,118 | B2 | * | 10/2002 | Dumlao et al. | 14/73 |
| 6,581,544 | B1 |   | 6/2003  | Smith |   |
| 6,817,316 | B1 |   | 11/2004 | Roussy |   |
| 7,287,807 | B2 | * | 10/2007 | Bowling | 296/186.2 |
| 7,578,534 | B2 | * | 8/2009  | Wuerfel, III | 296/24.35 |
| 2009/0013712 | A1 | * | 1/2009  | Norris | 62/407 |
| 2011/0138820 | A1 | * | 6/2011  | Weeth et al. | 62/62 |

FOREIGN PATENT DOCUMENTS

DE    EP 0 585 894 B1 *  1/1997

* cited by examiner

*Primary Examiner* — David Parsley
*Assistant Examiner* — George Andonyan
(74) *Attorney, Agent, or Firm* — The Van Winkle Law Firm; David M. Carter

(57) ABSTRACT

A trailer for transporting living fowl is provided and includes an enclosure defined by a top, a front wall, a rear wall, a floor, and first and second side walls. The side walls are made of fabric so that the living fowl may be loaded and unloaded from the sides of the trailer. A main air supply duct extends a substantial portion of the length of the enclosure and receives conditioned air from an apparatus for generating conditioned air. A plurality of spaced apart vertical side ducts are connected to the main air supply duct and provide support for the top of the enclosure. A plurality of spaced apart floor ducts are connected to the vertical side ducts.

11 Claims, 6 Drawing Sheets

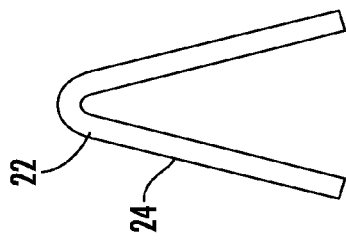
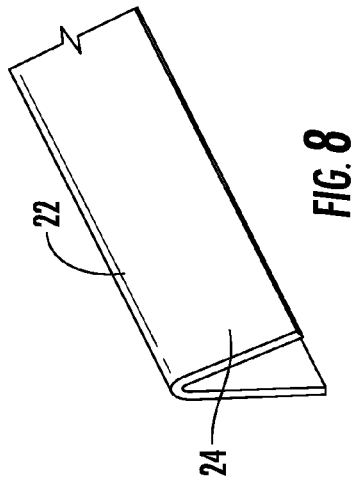
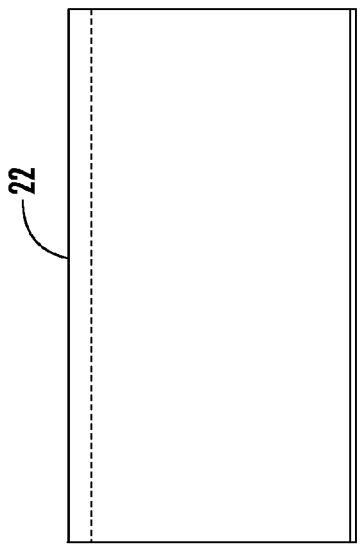
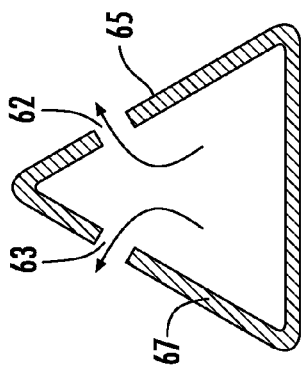

TRAILER FOR TRANSPORTING LIVING FOWL

BACKGROUND OF THE INVENTION

This invention relates to trailers for transporting living fowl. More particularly, it relates to trailers which provide conditioned air to the interior of the trailer during the transport of living fowl. One of the problems in transporting large numbers of living fowl, such as chickens, is the need to remove excess heat from their immediate environment, particularly during the summer months to ensure that a large number of the fowl will survive the transport. Another problem is the need to provide heat in their immediate environment during the winter months, also to ensure that a large number of the fowl will survive the transport.

For many years, fowl was transported in an open trailer. This technique permits a great deal of air circulation for cooling the fowl during transport. However, it is no longer widely accepted because of the direct exposure of fowl to the elements and because of damage to the fowl caused by high velocity air flow. Recently, fowl have been transported in closed trailers. These closed trailers have included air handling ducts and fans for circulating air. The air ducts may be connected to various sources of forced air, such as air conditioners, fans, and, in some cases, forced air heaters for winter transport. Air is often circulated from open grates in a false bottom floor of the trailer which run the length of the trailer. Even with more sophisticated environmental control systems, hot spots have developed where circulation is poor. It has been found that many of the fowl in the areas having hot spots do not survive a long transport.

A major innovation in the transport of living fowl is described in U.S. Pat. No. 4,481,870 issued to G. D. Smith. The G. D. Smith patent shows a duct ventilation system running lengthwise in the floor of the trailer which provides forced air between elongated parallel rows of boxes of fowl. Another major innovation in the transport of living fowl is described in U.S. Pat. No. 6,581,544 issued to Rocky L. Smith. The Rocky Smith patent describes an air conditioned trailer for transporting living fowl, including elongated air handling ducts located in the space between the floor and the bottom of the trailer. Openings are provided at the top of the ducts so that air can pass from the duct to the inside of the trailer above the floor. The ducts are tapered so that the velocity of conditioned air from the holes is substantially equalized for the length of the ducts.

SUMMARY OF THE INVENTION

In accordance with one form of this invention, there is provided a trailer for transporting living fowl having at least a first enclosure. The first enclosure is defined by a top, a front wall, a rear wall, a floor and a first side wall and a second side wall. At least the first side wall is movable so that the living fowl may be loaded and unloaded from a side of the trailer. An apparatus for generating conditioned air to be supplied to the first enclosure is provided. A main air supply duct receives conditioned air from the apparatus for generating conditioned air and extends a substantial portion of the length of the first enclosure. A plurality of spaced apart floor ducts, adjacent to the floor, extend for a substantial portion of the width of the first enclosure. The floor ducts are connected to the main air supply duct. The floor ducts have a plurality of air holes therein so that conditioned air will flow into the first enclosure.

In accordance with another form of this invention, there is provided a trailer for transporting living fowl including at least a first enclosure. The first enclosure is defined by a top, a front wall, a rear wall, a floor, a first side wall and a second side wall. At least the first side wall is movable so that the living fowl may be loaded and unloaded from a side of the trailer. An apparatus for generating conditioned air to be supplied to the first enclosure is provided. At least one main air supply duct runs along the top of the first enclosure and receives conditioned air from the apparatus for generating conditioned air. The main air supply duct extends a substantial portion of the length of the first enclosure. A plurality of spaced apart side ducts are located adjacent to the first and second side walls of the first enclosure and extend a substantial portion of the height of the first enclosure. The side ducts are connected to the main air supply duct. A plurality of holes are located in the side ducts so that conditioned air will flow into the first enclosure. The first and second side walls are made of fabric. The side ducts provide support for the top of the first enclosure.

In accordance with yet another form of this invention, there is provided a trailer for transporting live fowl, including at least one enclosure defined by a top, floor, front wall, rear wall, a first side wall and a second side wall. A substantial portion of the first side wall being made of fabric which does not provide substantial support for the top. Preferably, the fabric is insulated. A plurality of vertical air ducts adjacent to the fabric. The vertical air ducts extending from the floor to the top and having holes therein. The vertical air ducts providing support for the top and forming channels for conveying air to the inside of the enclosure.

In accordance with another form of this invention, there is provided a trailer for transporting a plurality of modules containing living fowl. The trailer includes at least one enclosure having a floor and at least one side wall. At least one elongated floor duct is provided for conveying air to the inside of the enclosure. The floor duct has first and second upwardly extending walls. The walls slope inwardly from the floor of the enclosure so that the cross section of the floor duct has somewhat of an inverted "V" shape. The floor duct is adapted to assist in guiding the modules into place while the trailer is being loaded and to assist in stabilizing the modules during transport.

In yet another form of this invention, there is provided a method for transporting cages containing living fowl in an air conditioned trailer having at least one movable side wall. A plurality of stacked cages is provided, forming modules. The side wall is opened. The modules are loaded into the trailer at the opened side wall. Rows of modules are formed in the trailer. The side wall is closed. Conditioned air is applied from the floor and sides of the trailer towards the rows of modules. Conditioned air from the rear of the trailer is applied towards the rows of modules and towards the front of the trailer.

BRIEF DESCRIPTION OF THE DRAWINGS

The subject matter which is regarded as the invention is set forth in the appended claims. The invention itself, however, together with further objects and advantages thereof may be better understood in reference to the following descriptions taken in conjunction with the accompanying drawings in which:

FIG. 6 is a side elevational view of the fowl cages support bracket of the embodiment of FIG. 1.

FIG. 7 is a front elevational view of the bracket of FIG. 6.

FIG. 8 is a partial perspective view of the bracket of FIG. 6.

FIG. 9 is a sectional of the floor ducts shown in FIG. 3.

DESCRIPTION OF THE PREFERRED EMBODIMENT

Figure 1:
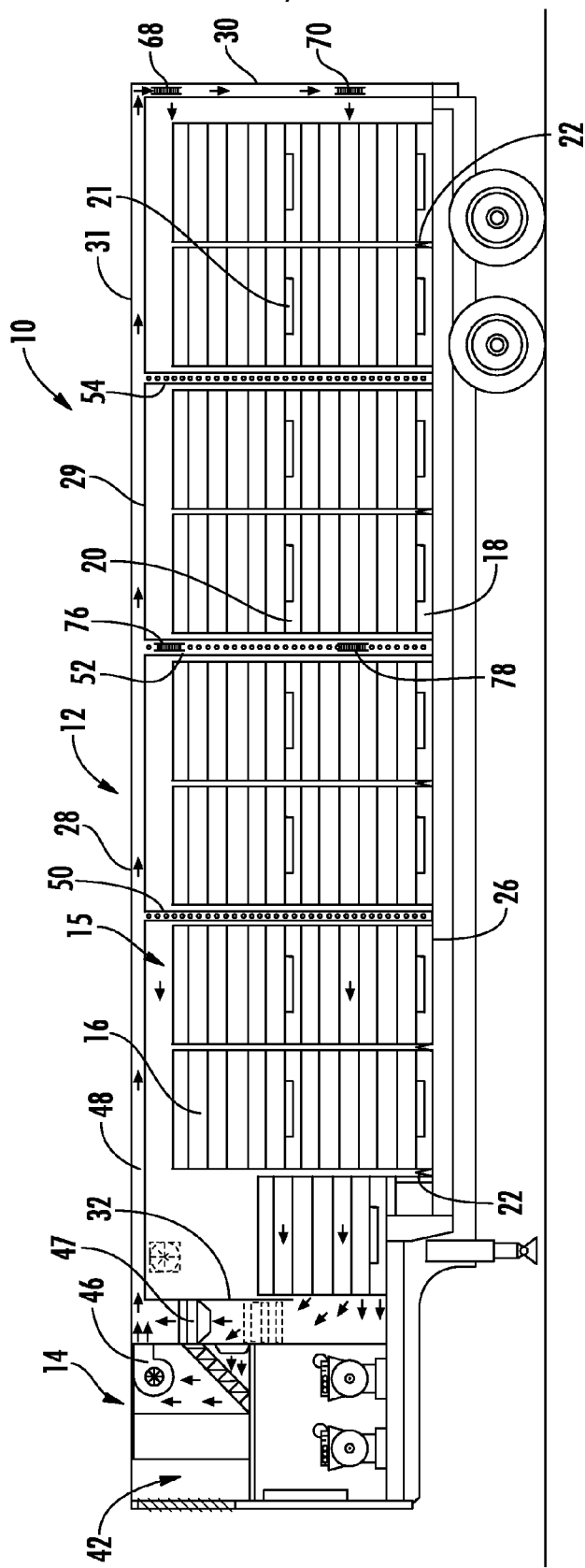
FIG. 1 is a side elevational view of one embodiment of the trailer of the subject invention with a side wall having been removed for illustrative purposes and with the trailer loaded with stacked cages of fowl.

Referring now more particularly to FIG. 1, there is provided trailer 10 for transporting living fowl. Trailer 10 includes first enclosure 12 and preferably, a second enclosure 14. Enclosure 12 is adapted to receive a plurality of modules 15 in the form of stacks of cages 16 containing living fowl. Modules 15 have bases 18 and 20, each having a slot 21 to enable the modules to be easily loaded and unloaded by a forklift. Preferably, each module 15 includes six stacked cages 16. The terms modules and stacked cages are used herein interchangeably. The modules 15 are secured in place inside the first enclosure by spaced apart brackets 22 which are welded to the floor 26 of first enclosure 12 and by the upwardly extending floor ducts 56, 58 and 60 referred to below. Brackets 22 and the floor ducts are particularly helpful in stabilizing the modules when the trailer is moving. As better seen in reference to FIGS. 6, 7 and 8, brackets 22 and floor ducts 56, 58 and 60 are somewhat of an inverted "V" shape with the sides 24 of brackets 22 and the sides 65 and 67 of the floor ducts sloped downwardly and outwardly at an angle so as to guide the stacked cages 16 into place as the modules 15 are loaded into the first enclosure. The first enclosure 12 is further defined by top 28, rear wall 30, front wall 32 which divides the first enclosure 12 and the second enclosure 14, and side walls 34 and 36 shown in FIG. 3. Top 28 includes ceiling 29, which is on the inside of the first enclosure 12, and roof 31, which is on the outside of the first enclosure. Each side wall is in the form of a pair of movable curtains 38 and 40 shown in FIGS. 2 and 4. These movable curtains are preferably made of an insulated fabric. The side walls are preferably in the form of accordion-like structures so that the side walls are readily opened and closed. The ability to open the side walls enables the multi-stacks of cages containing the fowl to be readily loaded and unloaded using a fork lift at the side of the trailer. Thus, there is no need to drive a fork lift into the inside of the trailer to load and unload the trailer. Loading and unloading the cages of fowl from the side of the trailer provides for a much more efficient loading and unloading operation. In addition, damage to the trailer during loading and unloading is greatly reduced. However, as will be discussed below, the insulated fabric curtain side walls do not provide substantial support for the roof 28 of the first enclosure.

Referring now more particularly to FIG. 1, second enclosure 14 houses apparatus 42 for generating conditioned air to provide conditioned air to the inside of the first enclosure 12. Apparatus 42 preferably includes an air conditioning unit and a heating unit.

Figure 2:
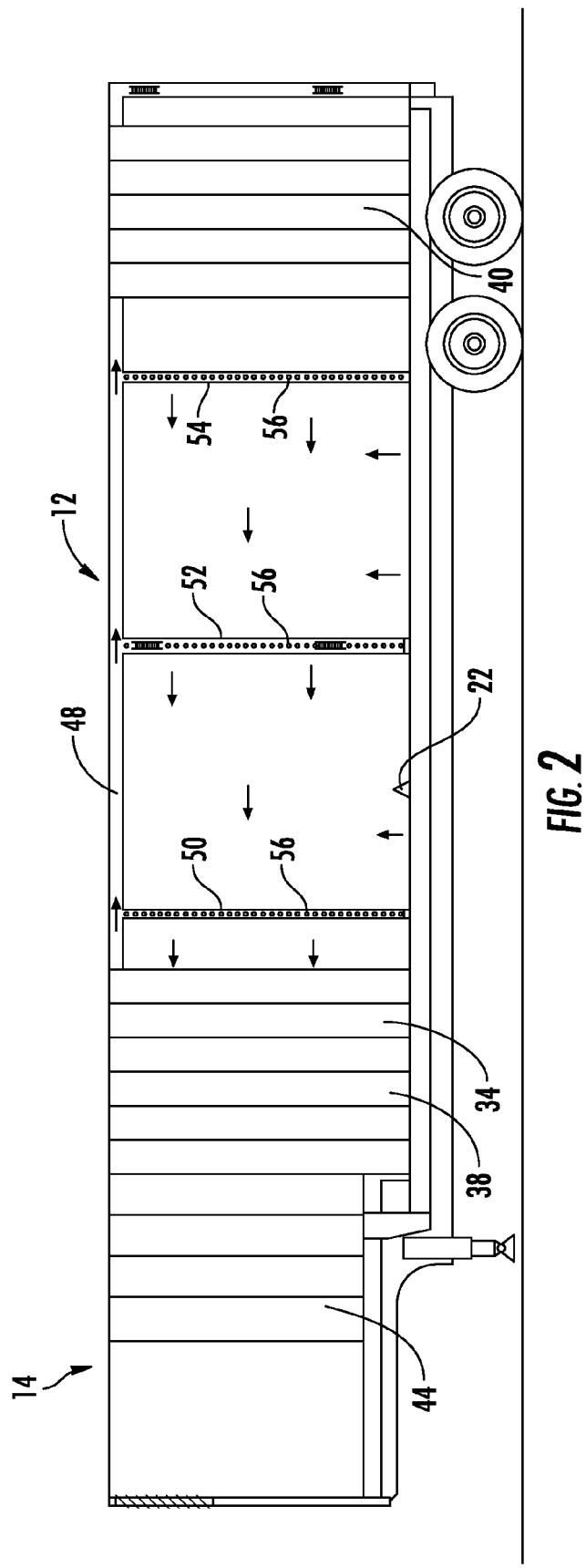
FIG. 2 is a side elevational view of the embodiment of FIG. 1 with a side wall, in the form of fabric curtains, being partially opened.
Figure 3:
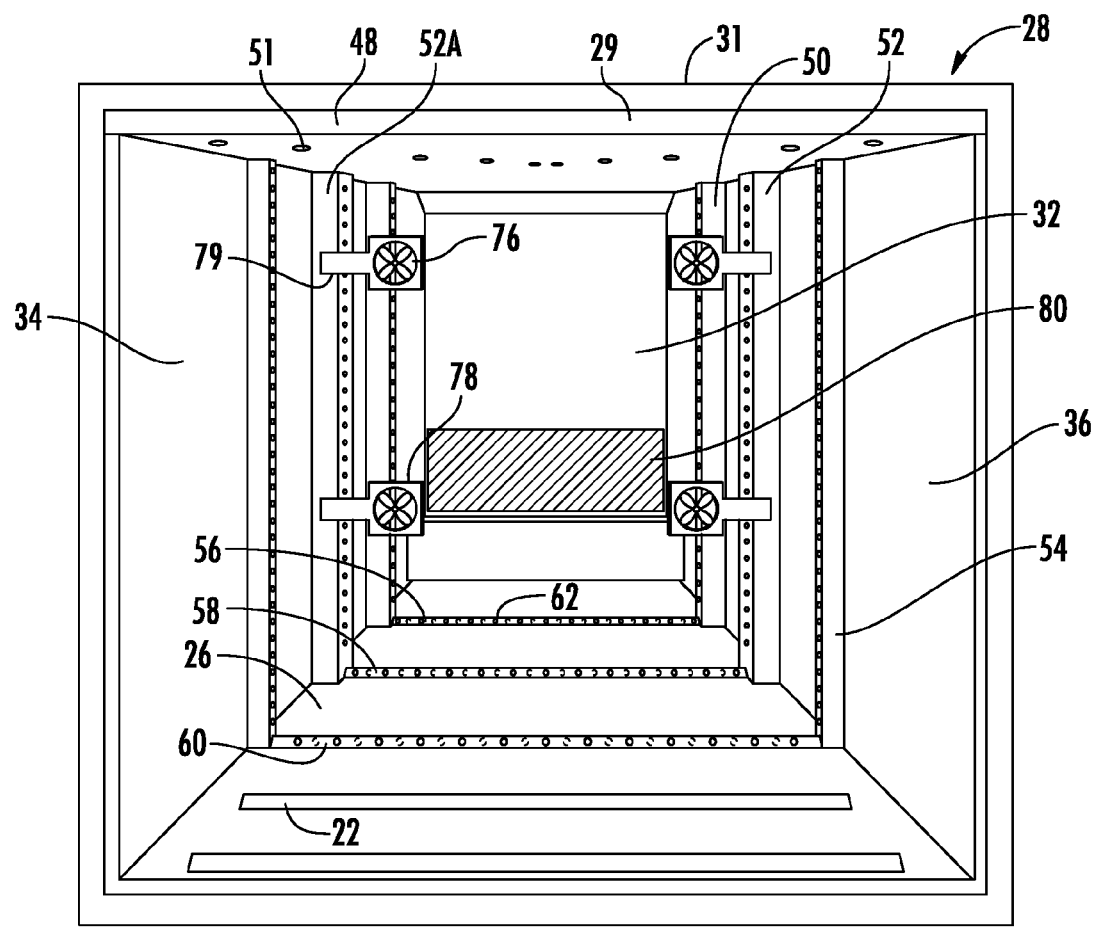
FIG. 3 is a rear elevational view of the embodiment of FIG. 1 with the rear wall removed and with some of the elements having been removed for illustrative purposes.
Figure 4:
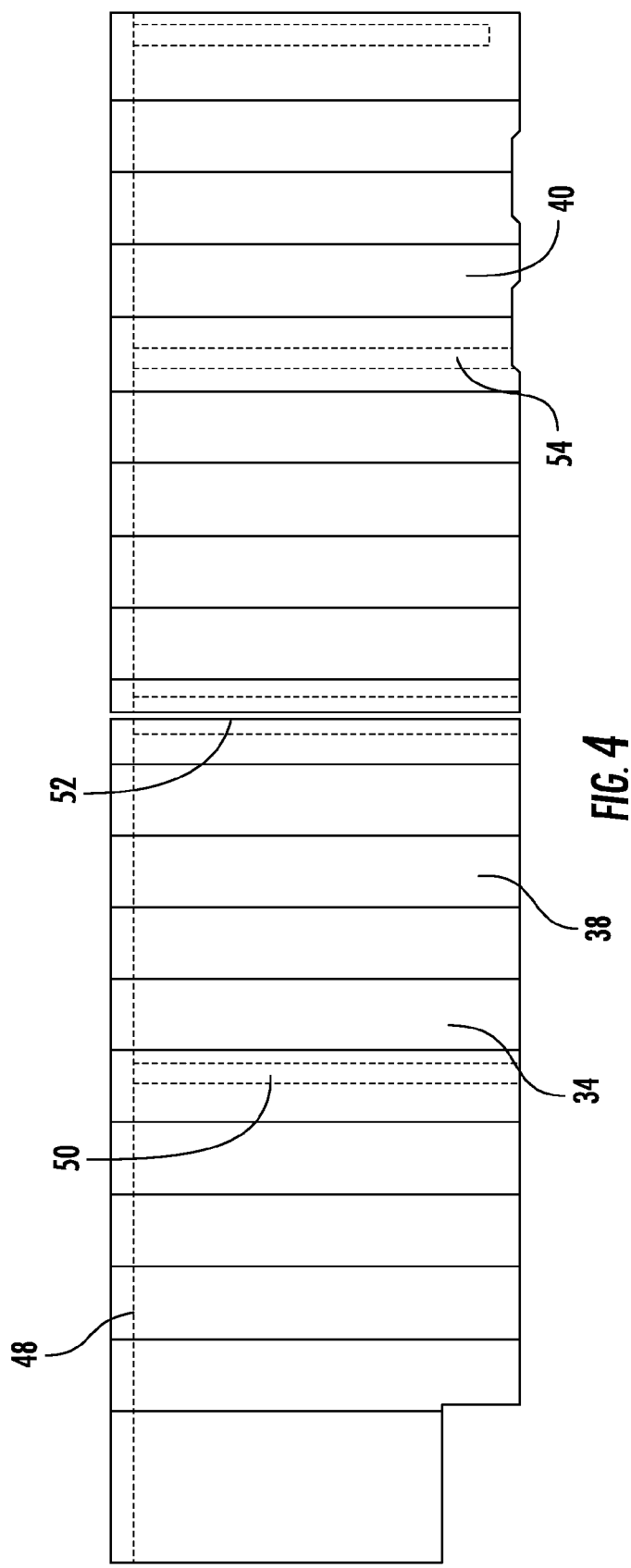
FIG. 4 is a side elevational view of the curtain system which forms the side walls of the trailer of the embodiment of FIG. 1 with the curtains fully closed and with the side ducts and main air supply duct shown in phantom.
Figure 5:
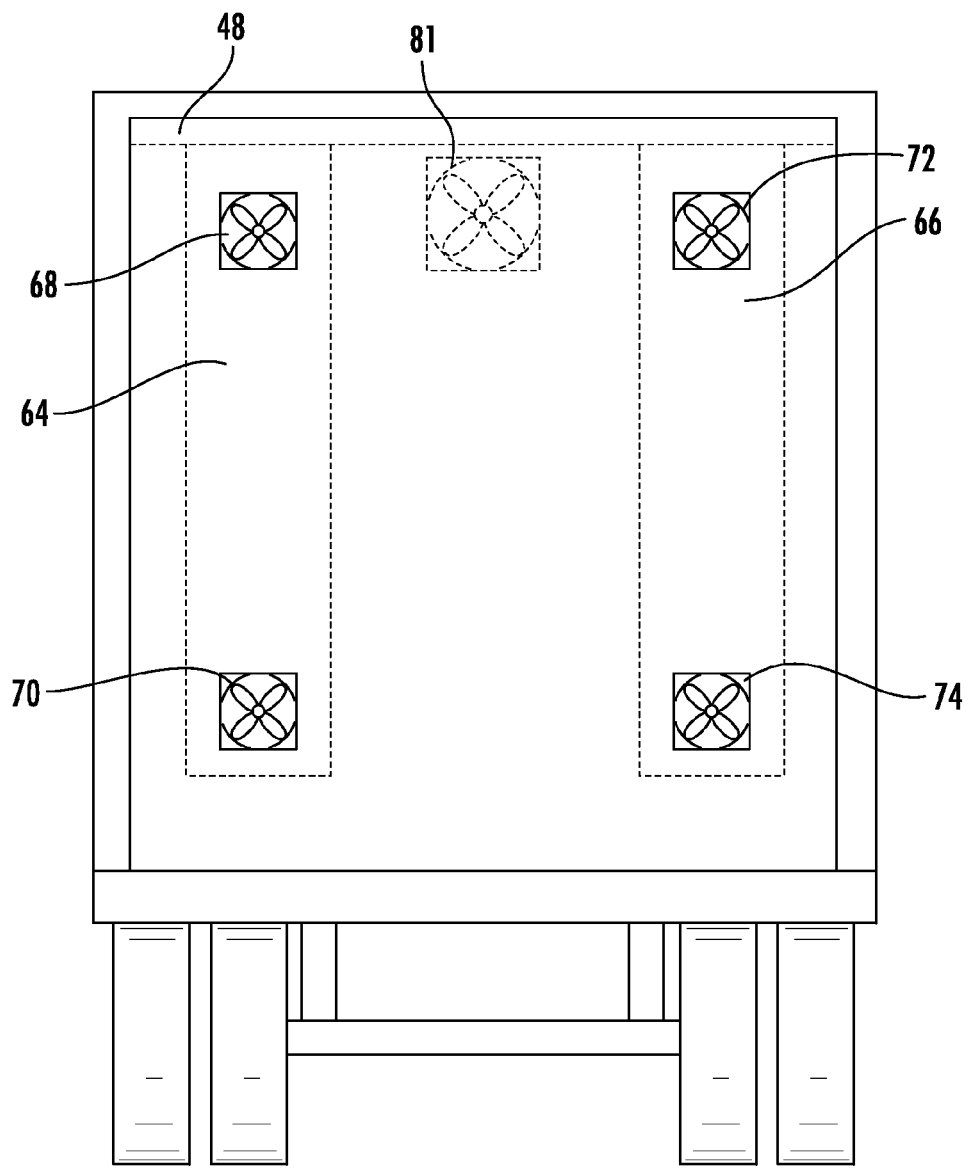
FIG. 5 is another rear elevational view of the embodiment of FIG. 1 with the rear wall intact showing the rear ducts and fans in phantom.

As illustrated in FIG. 2, the side walls 44 of second enclosure 14 are preferably solid. As shown in FIG. 1, a high velocity fan 46 is located in the second enclosure 14 near the top thereof and draws conditioned air from apparatus 42. First enclosure 12 includes main air supply duct 48 which preferably runs along the top 28 of the first enclosure and is preferably in the form of a duct extending across the entire top of the first enclosure as illustrated in FIGS. 3 and 5. In the preferred embodiment, the main air supply duct 48 is the entire space between ceiling 29 and roof 31. The high velocity blower 46 supplies conditioned air to main air supply duct 48 along with pressure fans 47. Preferably the main air supply duct 48 includes a plurality of holes 51 which open into the inside of the first enclosure 12 providing air flow from the top 28 of the first enclosure 12 to the inside of the first enclosure.

A plurality of spaced apart vertical side air ducts 50, 52, 52A and 54 extend at least along one side of the first enclosure 12, such as side wall 34. Preferably, the vertical air ducts are adjacent to both side walls 34 and 36. The tops of the vertical air ducts are connected to main air supply duct 48 so that conditioned air will flow into the vertical air ducts. Since the fabric curtain side walls 34 and 36 do not provide substantial support for the top 28, vertical air ducts 50, 52, 52A and 54 are made of robust rigid material, such as quarter inch aluminum tubing, to also serve as posts for providing support for the top 28 of first enclosure 12. Each vertical duct includes a plurality of holes 56 which point towards the inside of first enclosure 12 so that conditioned air flows into the inside of first enclosure 12. Preferably, vertical ducts 52 and 52A are larger and stronger than vertical ducts 50 and 54 so as to provide more support for the top 28 of the first enclosure 12 near the midpoint thereof. Also preferably, there are three additional corresponding vertical ducts on the opposite side of the first enclosure which provide an additional supply of air into the interior of the first enclosure and further provide additional support for the top 28 of the first enclosure. The vertical air ducts extend for a substantial portion of the height of the first enclosure.

As can be seen from FIG. 3, the vertical ducts are connected to spaced apart floor ducts 56, 58 and 60 which extend along the floor 26 for a substantial portion of the width of the first enclosure. Preferably, the floor ducts have a cross section in the shape of an equilateral triangle as shown in FIG. 9. Spacing between adjacent floor ducts is sufficient so that two rows of stacked boxes 16 may be received there between. The floor ducts 56, 58 and 60 each include a plurality of holes 62 and 63 on both upwardly extending faces 65 and 67 of the floor ducts so that air may flow upwardly between adjacent pairs of fowl containing cages 16. The combination of two vertical side ducts connected to a floor duct form a "V" shaped duct system. Thus, conditioned air flows from main air supply duct 48 into vertical ducts 50, 52, 52A and 54 and further into floor ducts 56, 58 and 60 with conditioned air being forced into the interior of the first enclosure 12 through the holes in all of the ducts. Thus, conditioned air completely surrounds the stacks of fowl containing boxes which are received within the first enclosure. These inverted "V" shaped floor ducts perform multiple functions of providing conditioned air, guiding the modules 15 into place on the floor 26, and stabilizing the modules.

As can be seen in FIGS. 1 and 5, there are a pair of vertical rear ducts 64 and 66 along the rear 30 of first container 12. The vertical rear ducts 64 and 66 are connected to main air supply duct 48. Duct 64 includes fans 68 and 70 mounted in openings in duct 64 for forcing conditioned air from the rear of the first enclosure towards the front. Likewise, duct 66 includes fans 72 and 74 mounted in openings in duct 66 also for forcing conditioned air from the rear of the first enclosure towards the front. Fan 81 is mounted on a bracket (not shown) attached to the inside of rear wall 30 for moving air toward the front of first enclosure 12. Also, fans 76 and 78 are mounted on brackets 79 and extend out from vertical side ducts 52 and 52A which forces conditioned air from the middle of the first enclosure 12 towards the front. The front wall 32 of the first container separates the first container from the second container and includes return air opening 80 which is covered by a filter for filtering airborne debris, such as feathers and the like.

By utilizing Applicant's invention which surrounds the stacks of cages containing fowl with moving conditioned air, the chances of the survival of the fowl after transport is greatly enhanced.

While the invention has been described in terms of the above embodiment, those skilled in the art will recognize that the invention can be practiced with modification within the spirit and scope of the appended claims.

The invention claimed is:

1. A combination of a trailer and cages for transporting living fowl comprising:
    at least a first enclosure; the first enclosure defined by a top, a front wall, a rear wall, a floor, a first side wall and a second side wall;
    at least one stack of cages;
    wherein the first and second side walls are made of a thermally insulated fabric along the majority of the trailers length, and having at least one movable side wall and wherein the stack of cages containing the living fowl may be loaded and unloaded from a side of the trailer;
    an apparatus for generating conditioned air to be supplied to the first enclosure;
    a main air supply duct located in the first enclosure and receiving conditioned air from the apparatus for generating conditioned air; the main air supply duct extending a substantial portion of the length of the first enclosure;
    a plurality of spaced apart floor ducts adjacent to the floor and extending for a substantial portion of the width of the first enclosure; wherein said floor ducts are tubular or formed rigid channels; the floor ducts connected to the main air supply duct; the floor ducts having a plurality of air holes therein and along a face of said channels so that conditioned air will flow into the first enclosure; the floor ducts extend above the floor; at least two of the floor ducts being spaced apart from one another so as to form an area on the floor for receiving the stack of cages; the stack of cages resting on the floor between said spaced apart floor ducts; said spaced apart floor ducts guide the stack of cages into place on the floor, point conditioned air towards the stack of cages and interior of the first enclosure, and assist in stabilizing said cages during transport;
    a plurality of vertical side posts located adjacent and along said fabric side walls of the first enclosure and extending for a substantial portion of the height of the first enclosure; wherein said vertical side posts are tubular or formed channels that provide substantial support for the of the enclosure; each of said vertical side posts connected to a corresponding floor duct.

2. The combination of a trailer and cages as set forth in claim further including a plurality of stacks of cages; the stacks of cages are arranged in a plurality of rows.

3. The combination of a trailer and cages as set forth in claim 1, wherein said vertical side posts are vertical side ducts; said vertical side ducts connected to the main air supply duct so that conditioned air will flow within the vertical side ducts.

4. The combination of a trailer and cages as set forth in claim 1 wherein the top of the first enclosure includes a roof and a ceiling; the ceiling being on the inside of the first enclosure; the main air supply duct formed by a space between the roof and the ceiling.

5. The combination of a trailer and cages as set forth in claim 1, further including a second enclosure; the apparatus for generating conditioned air received in the second enclosure.

6. The combination of a trailer and cages as set forth in claim 1 wherein the floor ducts have cross sections somewhat in the shape of an equilateral triangle having two sides projecting upwardly; each of the two sides having holes therein.

7. The combination of a trailer and cages as set forth in claim 3, further including a plurality of holes in the vertical side ducts so that conditioned air will flow into the first enclosure.

8. The combination of a trailer and cages as set forth in claim 3 wherein the main air supply duct runs along the top of the first enclosure; the vertical side ducts connecting the main air supply duct to the floor ducts.

9. The combination of a trailer and cages as set forth in claim 3 wherein the rear wall includes at least one rear duct; the rear duct connected to the first main supply air duct; the rear duct having at least one opening therein facing toward the inside of the first enclosure; a first fan located in the opening of the rear duct for directing conditioned air into the inside of the first enclosure.

10. The combination of a trailer and cages as set forth in claim 9, further including at least an additional fan located in the first enclosure between the rear wall and the second enclosure for directing conditioned air towards the second enclosure.

11. The combination of a trailer and cages as set forth in claim 10 wherein the additional fan is attached to one of the vertical side ducts.

* * * * *